Oct. 31, 1950 P. H. PETERS, JR., ET AL 2,528,241

FREQUENCY CONTROLLABLE MAGNETRON

Filed Jan. 2, 1947 2 Sheets-Sheet 1

Inventors:
Philip H. Peters Jr.,
John P. Blewett,
by Harry E. Dunham
Their Attorney.

Oct. 31, 1950 P. H. PETERS, JR., ET AL 2,528,241

FREQUENCY CONTROLLABLE MAGNETRON

Filed Jan. 2, 1947 2 Sheets-Sheet 2

Inventors:
Philip H. Peters Jr.,
John P. Blewett,
by Harry E. Dunham
Their Attorney.

Patented Oct. 31, 1950 2,528,241

UNITED STATES PATENT OFFICE 2,528,241

FREQUENCY CONTROLLABLE MAGNETRON

Philip H. Peters, Jr., and John P. Blewett, Schenectady, N. Y., assignors to General Electric Company, a corporation of New York Application January 2, 1947, Serial No. 719,704

10 Claims. (Cl. 332—5)

Figures 1, 2:
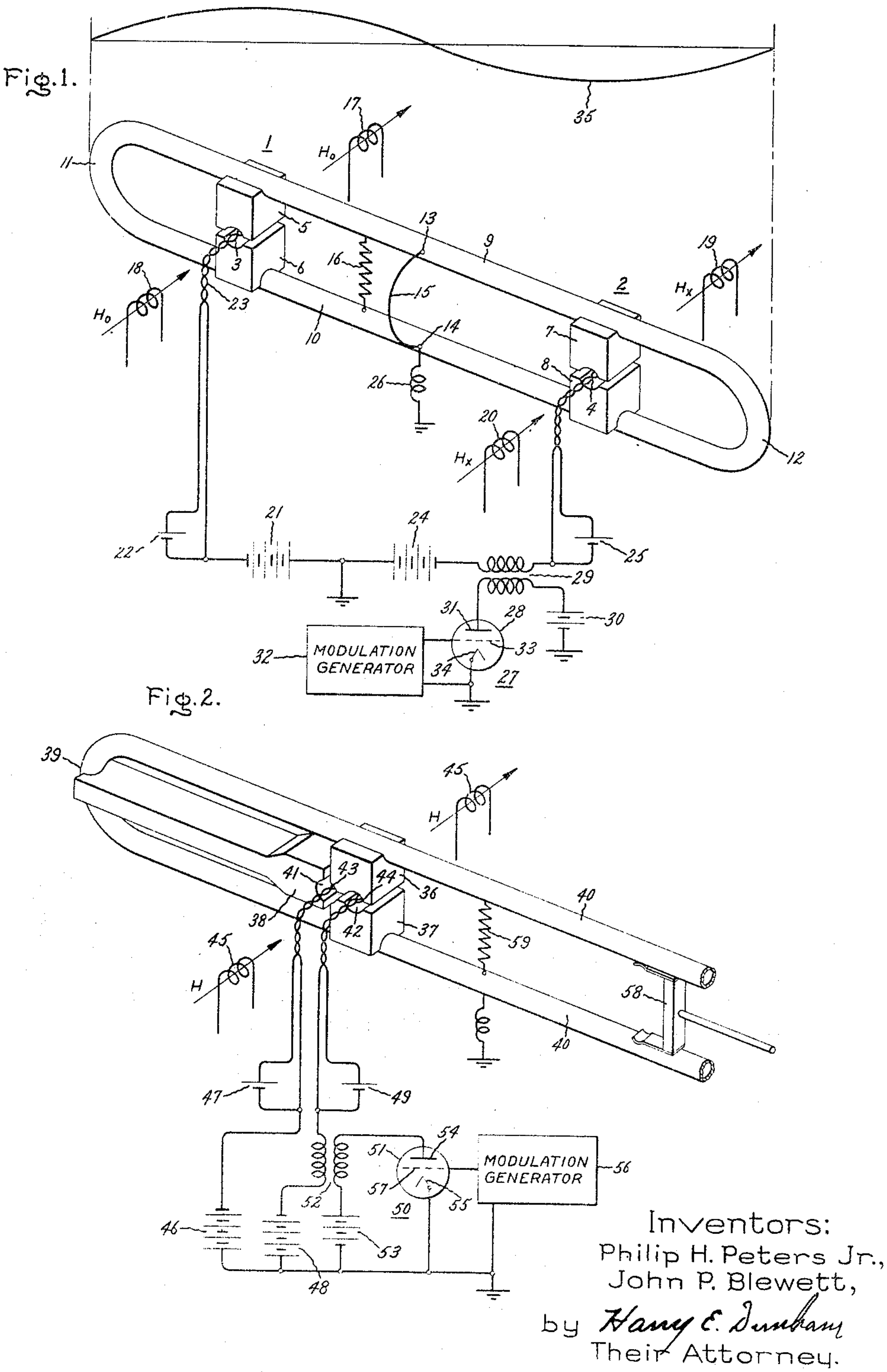

This invention relates to magnetron type electrical discharge devices and more particularly to a novel method and structure especially useful for the generation of electromagnetic oscillations of stabilized frequency or for the generation of frequency modulated oscillations.

As is well known in the communications and related arts, it is customary to transmit intelligence by modulating a high frequency electromagnetic wave capable of being projected into space with a decipherable signal component which is an accurate and faithful representation of the intelligence to be transmitted. Such modulation may be accomplished by causing any one of the parameters of the electromagnetic wave (i. e., amplitude, frequency or phase) to vary in continuous correspondence with the desired intelligence, the resultant variations constituting the mentioned signal component. If, for any of numerous possible reasons, distorting factors are introduced by the apparatus used to convert the intelligence into a signal component, the latter will be correspondingly distorted with the result that the modulation is not of high fidelity and the intelligibility of the transmission is impaired. If the intelligence is speech, television signals or music the degree of impairment may be such as to render the transmission completely useless.

For accurate and faithful transmission by the aforesaid methods and for numerous other applications, it is highly desirable to have available a high or ultra high frequency oscillations source which is capable of generating oscillations of highly stable frequency or oscillations the frequency of which may be controllably varied at very high rates. With such a source, signal distortion normally caused by undesired and uncontrolled frequency fluctuations may be minimized.

Heretofore, the usefulness of the magnetron type of oscillator has been limited by the difficulty in readily and efficiently effecting distortion free modulation of useful magnitude. The reason therefor may be attributable largely to an inherent frequency instability characteristic of most magnetrons. The results thereof have been that where either amplitude or frequency modulation has been attempted heretofore with magnetrons, a large amount of undesirable and uncontrollable frequency fluctuation has been found to be present as a signal distorting factor. Moreover, the methods heretofore attempted have not been satisfactory for the reason that modulation could not be effected with apparatus of suitable simplicity and efficiency.

Accordingly it is the general object of this invention to provide a magnetron type method and apparatus for the generation of either electromagnetic oscillations of highly stabilized frequency or electromagnetic oscillations of readily controllable and rapidly variable frequency.

It is a further object of this invention to provide a method and apparatus which may be used to effect a desired amount of modulation of the output of a magnetron oscillator with a minimum amount of distortion attributable to random frequency fluctuations, with relatively high efficiency and with simple, compact apparatus.

Generally speaking, this object is accomplished by the provision of a novel electron tube structure in which two or more magnetron electrode configurations are coupled together in such fashion that one behaves as a conventional oscillator generating high frequency electromagnetic waves, while the other behaves as a controllable variable electronic impedance driven by the oscillator and reacting therewith to produce controllable changes in the oscillation frequency. Such controllable changes may be used either to effect frequency modulation and/or to maintain frequency stability by compensating for undesirable random frequency fluctuations.

Figure 3:
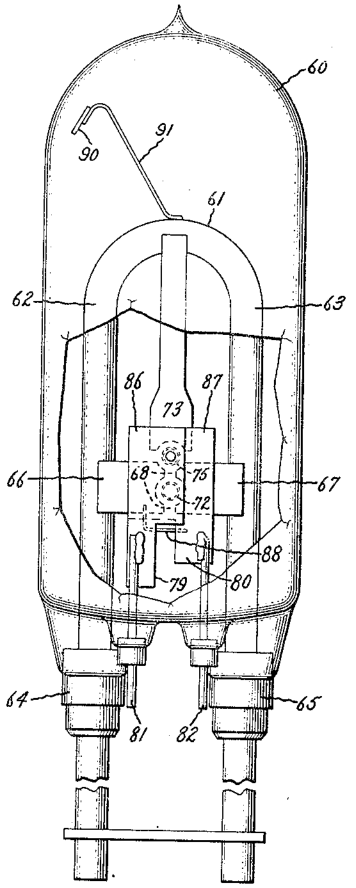
Figure 4:
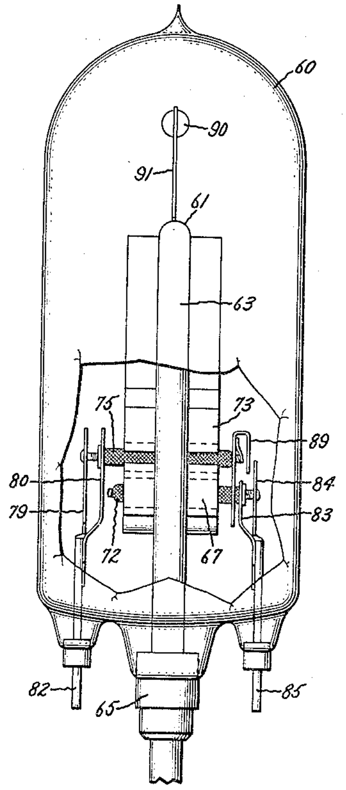
Figure 5:
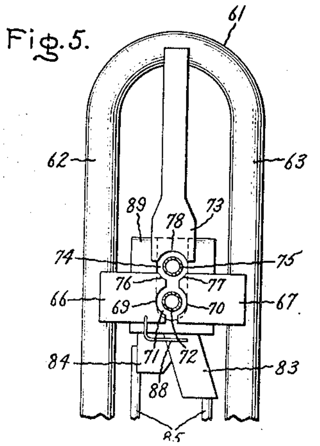

The features of the invention desired to be protected are pointed out in the appended claims. The invention itself, together with its further objects and advantages, may best be understood by reference to the following description and to the appended drawings in which Fig. 1 represents a schematic circuit illustrating the principle of the invention; Fig. 2 represents a schematic circuit embodying one form of the invention employing the novel composite tube combining within a single envelope two magnetron elements to accomplish the object of the invention; while Figs. 3, 4 and 5 represent a detailed drawing of the composite tube of Fig. 2.

Referring to Fig. 1 of the drawings, 1 and 2 each represent conventional type split anode magnetrons, employed respectively as an oscillator and a controllable reactance tube. The circuit parameters of the reactance tube 2 are normally so proportioned that the tube will not generate independent, self-sustained oscillations, i. e., it functions only as an impedance subjected to whatever oscillations are imposed on it by the oscillator 1. Cathodes 3 and 4 are each surrounded by a pair of anodes 5, 6, 7 and 8 having juxtaposed semi-cylindrical faces defining a generally cylindrical space about the cathodes 3 and 4, and connected to a full wave resonant transmission line comprising parallel rods 9 and 10 of suitable metallic construction such as copper tubing. The transmission line may be closed by curved end portions 11 and 12 or terminated open-ended without such portions. It is shorted at its midpoints 13 and 14 by the low resistance loop 15 to form two closed-end half-wave resonant sections. The load 16 which may be a simple resistor, is provided to absorb the output of the system for appropriate usage in further circuits (not shown). Approximately equal magnetic fields $H_0$ and $H_x$, supplied by magnetic coils 17, 18, 19 and 20 energized by any suitable source of unidirectional current (not shown) are provided in accordance with well known magnetron practices. It will be understood that the respective pairs of anodes and their associated cathodes will each be enclosed within an evacuated envelope but for clarity of illustration these are not shown.

For the purpose of providing the necessary operating voltages and currents there is provided in the case of magnetron oscillator 1 a source of direct current anode voltage 21 which imposes in conventional manner a relatively high unidirectional potential between the anodes 5 and 6 and the cathode 3. The cathode 3 may be heated in conventional manner by current from a source of voltage 22 connected to the cathode by leads 23. Similarly, for the magnetron reactance tube 2 there is provided a source of voltage 24 connected between the anodes 7 and 8 and the cathode 4. The cathode 4 may be similarly supplied with heating current by a source of voltage 25. Both high voltage sources 21 and 24 are connected at their positive terminals to the anodes through the ground connection shown and a high frequency choke 26.

For the purpose of modulating the system by changing the reactance of the reactance tube 2 in accordance with intelligence signals there is provided a source 27 of modulating voltage which may comprise a grid controlled discharge tube 28, a transformer 29 in the plate circuit thereof and a source of anode voltage 30 for anode 31 of the tube 28. The tube 28 may be driven through its grid circuit by any source of intelligible signals 32 connected between the grid 33 and cathode 34 of the tube 28 in the conventional manner. It will be understood that any of the number of circuits known in the art may be used to impose the modulating voltage between the cathode 4 and the corresponding anodes 7 and 8, the source 27 here shown being for purposes of illustration only. The operation of the modulating source 27 will be explained more fully hereinafter.

When suitable operating voltages are applied to the magnetron 1 in the presence of the magnetic field of coils 17 and 18, it will oscillate at a high frequency to give the voltage distribution along the transmission line 9—10 shown by the curve 35, namely, two one-half wave lengths. As is well known, the frequency will be determined by the several circuit parameters, principally by those of transmission line 9—10 and also, to some extent, by the strength of the magnetic field and the magnitude of the voltage between the cathode 3 and the anodes 5 and 6.

With respect to the reactance magnetron 2, it is known that an electronic tube of the magnetron type can be made to behave as a variable reactance, the value of the reactance depending upon the choice of tube parameters, such as the anode voltage, anode to cathode radius ratio and the magnetic field. (c. f. U. S. Letters Patent 2,241,976 to J. P. Blewett and Simon Ramo.) According to the prevailing view the changes in reactance are due in some manner to variations in the effective dielectric constant of the inter-electrode spaces occasioned by variations in the properties (e. g. mean space charge radius and density) of the electron space charge in such spaces. As is known, the space charge properties will be a function of the above mentioned tube parameters.

If, in accordance with the principles of the invention, the tube parameters of reactance magnetron 2 are so adjusted that the tube does not generate self-sustained oscillations, i. e., it is subject only to those forced upon it by the oscillator, and the voltage between the cathode 4 and anodes 7 and 8 is varied by modulation signals, the change in the effective impedance of magnetron 2 between anode 7 and anode 8 will cause the frequency of the oscillator to shift proportionately. It will be understood that a similar effect may be obtained by changing the filament excitation or the magnetic field Hx of the tube 11 since such changes will also result in alteration in the space charge radius and density and therefore in changed effective impedance.

As an example of the above system we have successfully employed a conventional type magnetron tube as the oscillator magnetron 1 operating at about 750 megacycles with about 200 watts output. Deviations as high as 12 megacycles were obtained, the deviation varying approximately linearly with the voltage change applied to the magnetron 2 over the greater part of the 12 megacycle range. At the same time, very little undesirable amplitude modulation was found to be present. The peak power input to the reactance magnetron 2 was of the order of 40 watts for a 12 mc. deviation. The voltage applied to the reactance magnetron 2 may be high enough to excite lower frequency modes of oscillation but we have found that either the load 16 or the loop 15 will prevent the lower order oscillations from arising. We have also found that the maximum possible deviation in the frequency of oscillation obtainable by modulation will be dependent to some extend upon the position of the load 16 as well as on the voltage of the reactance tube. The maximum deviation generally occurs near the maximum power output.

More satisfactory results can be obtained by employing these principles with the novel tube structure of the invention. In that structure both the reactance and the oscillating sections are positioned adjacent to each other within a single envelope at approximately the same point on the transmission line. In addition to better frequency control, this arrangement has the further advantage that both oscillator and reactance sections may be made to share a common magnetic field and loading of the transmission line is simplified, i. e. the position of the load along the line may be varied in the same manner as with conventional tubes. Such a tube could be built using separate sets of elements for the reactance and the oscillating sections i. e., separate sets of anode blocks with corresponding cathodes. However, a simpler structure results when only one set of anode blocks is used with separate cathodes positioned in separate cavities within the anode blocks. Such an arrangement is shown in Figs. 2 and 3.

Referring to Fig. 2, there are provided a pair of opposing anode blocks 36 and 37 and a third electrically neutral block 38 attached to the electrically neutral midpoint 39 of the two-wire parallel transmission line 40, in the manner of the construction described and claimed in a copending application, Serial No. 601,126, filed June 23, 1945, by Donald A. Wilbur, Patent No. 2,462,698, and assigned to the same assignee as the present application. Formed within the three blocks 36, 37 and 38 are two cylindrical magnetron cavities 41 and 42 provided, respectively, with cathodes 43 and 44 as shown. A common magnetic field H supplied by coils 45 or by permanent magnets (not shown) is arranged to pass through each of the cavities in a direction parallel to the axis of the cathodes. It will be understood that at least the portion of the structure including the blocks 36, 37 and 38 will be enclosed with a suitable evacuated envelope although for clarity of illustration such is not shown. Moreover, where tube operating conditions make such action desirable, the functions of the respective sections may be reversed, i. e., the oscillating section formed about the cavity 41 may be made to serve as the reactance section by appropriate changes in the potentials involved, and, conversely, the reactance section formed about the cavity 42 may be made to serve as the oscillator by similar changes.

In a manner similar to that of Fig. 1, power circuits are provided for both the oscillating and the reactance tube sections. In the case of the oscillating section formed about the cavity 41 there is provided a source of unidirectional voltage 46 imposed between the cathode and anode while the filament voltage is supplied by a source of current 47. For the reactance sections there is provided a source of high potential 48 between the anodes and cathode while a source of filament supply voltage is provided at 49. The modulating source 50 may be identical with that of Fig. 1 and comprises a grid controlled discharge device 51, transformer 52 and a source of anode voltage 53 connected between anode 54 and cathode 55 in a manner similar to that of Fig. 1. Source 56 of intelligible signals may impose a modulating signal between grid 57 and cathode 55 as before. The tuned transmission line 40 is terminated by a tuning short 58 which is employed to adjust the frequency of the line in a manner well known in the art. The load 59 is connected across the lines in a similar manner to that of the load 16 in Fig. 1.

It will be found that when under certain conditions of operation one of the cathodes 43 and 44 is more positive than the other, the more positive cathode may be constructed without heating means since it will be found that the more positive cathode will draw a sufficient quantity of electrons from the other space charge chamber to permit satisfactory operation in its own space charge chamber. Under such circumstances the construction can obviously be simplified by the omission of a part at least of the cathode leads with consequent lessening of undesirable interelectrode capacity and simplification of the lead in structure.

With a composite tube of this type, frequency modulation of the oscillator can be effected with very little amplitude modulation (e. g. less than 2 percent for maximum frequency shift). As one example of the operating possibilities of the arrangement, it is noted that the maximum frequency deviation with an oscillation frequency of about 850 megacycles was found to be about —12 megacycles. The deviation in frequency with respect to the modulating voltage applied to the reactance section was found to be fairly linear over the greater portion of this twelve megacycle range, the sensitivity being about 60 volts per megacycle. The modulating peak power for the maximum deviation was found to be about 20 to 25 watts.

It will be apparent that the aforedescribed apparatus may also be readily employed for maintaining the oscillation frequency at a constant value where for example, it is desired to have an oscillator of highly stable frequency. That result may be accomplished by applying to the reactance section, i. e., between the cathode 44 and the corresponding anodes, a voltage which is a measure of any random frequency fluctuation of the oscillator circuit. Such voltage may be arranged to effect a change in the reactance of the reactance section sufficient to cause a frequency change corresponding and opposite to the random fluctuation, thereby compensating for that random fluctuation. A circuit for causing such correction is described and claimed in an application of Philip H. Peters, Jr., Serial No. 734,920, filed March 15, 1947, now Patent No. 2,490,007.

Referring now to Figs. 3, 4 and 5 of the drawings, there is shown in greater detail a composite tube of the type referred to above. Fig. 3 represents a view thereof partly in section: Fig. 4 represents a side view of Fig. 3; while Fig. 5 shows in greater detail the electrode structure of Figs. 3 and 4. The device includes an envelope 60 preferably formed of glass, within which is mounted a generally U-shaped conductor 61 which may to advantage, be formed of copper tubing. The arms 62 and 63 of the U-shaped tubing extend through the end wall of the envelope and are sealed thereto by suitable seal constructions including fernico sleeves 64 and 65 which are joined, respectively, to the envelope and the arms of the U-shaped conductor. The conductor 61, including arms 62 and 63 which extend to the exterior of the envelope, provides a parallel wire transmission line as already indicated in the descriptions of Fig. 2 above. Within the envelope 60 a pair of anode members 66 and 67 are supported in opposed relation from the arms 62 and 63 of the U-shaped conductor 61. The anode members are spaced at the inner ends thereof thereby forming a gap 68. They are also provided with semi-cylindrical faces 69 and 70, respectively, which define a generally cylindrical cavity 71 surrounding and coaxial with a cathode 72. A third anode 73 is supported from a neutral point with respect to the high frequency voltage of the magnetron which, in this case, is the central point of the U portion of the U-shaped conductor 61, as shown. The anode 73 extends parallel to and midway between the arms of the U-shaped conductor 61 and terminates short of the anode members 66 and 67 to provide a second generally cylindrical cavity 74 surrounding and coaxial with a second cathode 75. The cavity is defined by arcuate surfaces 76, 77 and 78, formed on the anode members 66 and 67 and the electrodes 73, respectively.

The cathodes 72 and 75 which may be of tungsten wire, with or without emissive coatings well known in the art, may be supported on the axis of the generally cylindrical cavities heretofore indicated by any suitable means. For example, cathode 75 may be supported by resilient supporting conductors 79 and 80, which are secured to relatively rigid lead-in conductors 81 and 82, respectively, which are in turn sealed through the end walls of the envelope in any suitable manner. Similarly, the cathode 72 is supported within its associated cylindrical cavity by the resilient supporting conductors 83 and 84 similar to conductors 79 and 80 and which are secured to relatively rigid lead-in conductors 85 similar to conductors 81 and 82. The latter are in turn sealed through the end walls of the envelope in any suitable manner.

The cathodes 72 and 75 may be of the form comprising two coaxial sleeves, one of each of which is connected to one of the resilient supporting conductors in the respective pairs of resilient supporting conductors 79, 80, 83 and 84. As is known in the art, coaxial constructions of this type may be used to reduce the magnetic effects of the cathode heating currents.

As is indicated in the drawing, the resilient supporting conductors 79 and 80 terminate at their inner ends in overlapping flattened portions 86 and 87, having sufficient surface area to serve as shields preventing the escape of electrons from the interelectrode spaces and migration to the wall of the envelope or the seals. They thereby minimize the known destructive effects of such electrons on the envelope and seals. Similar portions are provided on conductors 83 and 84. In addition, a shield member 88 may be connected to the anode member 66 and extend over the gap 68 to collect electrons escaping therefrom. Further, a shield 89 may be provided on cathode 75 or elsewhere if desired. A suitable getter may be provided on a getter support 90 supported near the inner wall of the envelope by a conductor 91, secured to the end of the U-shaped conductor.

We have found that it is preferable to use direct current in the cathodes for the reason that an alternating supply voltage in the cathode may produce objectionable modulation on its own account and accordingly distorts the desired modulation.

While we have shown and described particular embodiments of the invention, it will be obvious to those skilled in the art that changes and modifications may be made without departing from our invention in its broader aspects, and we, therefore, aim in the appended claims to cover all such changes and modifications as fall within the true spirit and scope of the invention.

What we claim as new and desire to secure by Letters Patent of the United States is:

1. An electron discharge device of the magnetron type capable of generating frequency controllable electromagnetic oscillations comprising, a resonant circuit, anode-electrode means having juxtaposed surfaces defining a space charge chamber adapted to accommodate a rotating space charge of the magnetron type, said electrode means being conductively connected to said circuit in energy exchanging relationship therewith and adapted to be energized to generate oscillations in said circuit, anode electrode means connected to said circuit at substantially the same electrical point as said first mentioned electrode means and having surfaces defining a second space charge chamber in close proximity to said first space charge chamber and also adapted to accommodate a rotating space charge of the magnetron type, means supplying magnetic fields of substantially equal magnitudes to said first and second space charge chambers to form said rotating space charges, said second mentioned anode-electrode means being adapted to be energized to constitute a variable non-oscillating electronic impedance in operative relation to said first mentioned anode-electrode means, cathode means in operative relation to each of said space charge chambers, and an hermetically sealed envelope enclosing said space charge chambers.

2. An electron discharge device of the magnetron type capable of generating frequency controllable electromagnetic oscillations comprising, a resonant circuit, a pair of anode electrodes having juxtaposed surfaces defining a space charge chamber adapted to accommodate a rotating space charge of the magnetron type, each of said electrodes being conductively connected to different points on said circuit in energy exchanging relationship therewith and adapted to be energized to generate oscillations in said circuit, anode electrode means connected to said circuit at substantially the same electrical point as said electrodes and having surfaces defining a second space charge chamber in close proximity to said first space charge chamber and also adapted to accommodate a rotating space charge of the magnetron type, means supplying magnetic fields of substantially equal magnitudes to said first and second space charge chambers to form said rotating space charges, said anode-electrode means being adapted to be energized to constitute a variable non-oscillating electronic impedance in operative relation to said anode electrodes, cathode means in operative relation to each of said space charge chambers, and an hermetically sealed envelope enclosing said space charge chambers.

3. An electron discharge device of the magnetron type capable of generating frequency controllable electromagnetic oscillations comprising, a resonant circuit having a point electrically neutral with respect to high frequency voltages therein, anode-electrode means having juxtaposed surfaces defining a space charge chamber adapted to accommodate a rotating space charge of the magnetron type, said electrode means being conductively connected to said circuit in energy exchanging relationship therewith and adapted to be energized to generate oscillations in said circuit, anode-electrode means connected to said point having surfaces defining with said first mentioned anode-electrode means a second space charge chamber in close proximity to said first space charge chamber and also adapted to accommodate a rotating space charge of the magnetron type, means supplying magnetic fields of substantially equal magnitudes to said first and second space charge chambers to form said rotating space charges, said second mentioned anode-electrode means being adapted to be energized to constitute a variable non-oscillating electronic impedance in operative relation to said first mentioned anode-electrode means, cathode means in operative relationship to each of said space charge chambers, and an hermetically sealed envelope enclosing said space charge chambers.

4. An electron discharge device of the magnetron type capable of generating frequency controllable electromagnetic oscillations comprising, a resonant circuit having a point electrically neutral with respect to high frequency voltages therein, a pair of anode electrodes having juxtaposed surfaces defining a space charge chamber adapted to accommodate a rotating space charge of the magnetron type, each of said electrodes being conductively connected to different points on said circuit in energy exchanging relationship therewith and adapted to be energized to generate oscillations in said circuit, anode-electrode means connected to said point having surfaces defining with said anode electrodes a second space charge chamber in close proximity to said first space charge chamber and also adapted to accommodate a rotating space charge of the magnetron type, means supplying magnetic fields of substantially equal magnitudes to said first and second space charge chambers to form said rotating space charges, said anode-electrode means being adapted to be energized to constitute a variable non-oscillating electronic impedance in operative relation to said anode electrodes, cathode means in operative relationship to each of said space charge chambers, and an hermetically sealed envelope enclosing said space charge chambers.

5. An electron discharge device of the magnetron type capable of generating frequency controllable electromagnetic oscillations comprising, a resonant circuit including a parallel wire transmission line closed at one end by a transverse portion, anode-electrode means having juxtaposed surfaces defining a space charge chamber adapted to accommodate a rotating space charge of the magnetron type, said electrode means being conductively connected to said line in energy exchanging relationship therewith and adapted to be energized to generate oscillations in said circuit, anode-electrode means connected to the midpoint of said transverse portion having surfaces defining with said first mentioned anode-electrode means a second space charge chamber in close proximity to said first space charge chamber and also adapted to accommodate a rotating space charge of the magnetron type, means supplying magnetic fields of substantially equal magnitudes to said first and second space charge chambers to form said rotating space charges, said second mentioned anode-electrode means being adapted to be energized to constitute a variable non-oscillating electronic impedance in operative relation to said first mentioned anode-electrode means, cathode means in operative relationship to each of said space charge chambers, and an hermetically sealed envelope enclosing said space charge chambers.

6. An electron discharge device of the magnetron type capable of generating frequency controllable electromagnetic oscillations comprising, a resonant circuit including a parallel wire transmission line closed at one end by a transverse portion, a pair of anode electrodes having juxtaposed surfaces defining a space charge chamber adapted to accommodate a rotating space charge of the magnetron type, each of said electrodes being conductively connected to different points on said line in energy exchanging relationship therewith and adapted to be energized to generate oscillations in said circuit, anode-electrode means connected to the midpoint of said transverse portion having surfaces defining with said anode electrodes a second space charge chamber in close proximity to said first space charge chamber and also adapted to accommodate a rotating space charge of the magnetron type, means supplying magnetic fields of substantially equal magnitudes to said first and second space charge chambers to form said rotating space charges, said anode-electrode means being adapted to be energized to constitute a variable non-oscillating electronic impedance in operative relation to said anode electrodes, cathode means in operative relationship to each of said space charge chambers, and an hermetically sealed envelope enclosing said space charge chambers.

7. An oscillator capable of generating frequency controllable electromagnetic oscillations including, a resonant circuit, an electron discharge device comprising anode-electrode means having juxtaposed surfaces defining a space charge chamber adapted to accommodate a rotating space charge of the magnetron type, said electrode means being conductively connected to said circuit in energy exchanging relationship therewith, anode-electrode means connected to said circuit at substantially the same electrical point as said first mentioned electrode means and having surfaces defining a second space charge chamber in close proximity to said first space charge chamber and also adapted to accommodate a rotating space charge of the magnetron type, means supplying magnetic fields of substantially equal magnitudes to said first and second space charge chambers to form said rotating space charges, cathode means in operative relation to each of said space charge chambers and an hermetically sealed envelope enclosing said space charge chambers, said oscillator also including means for energizing said first mentioned electrode means to establish a rotating space charge of the magnetron type in said first mentioned chamber and thereby to generate oscillations in said circuit, means for energizing said second mentioned electrode means to establish within said second mentioned chamber a rotating space charge of the magnetron type insufficient to establish oscillations therein whereby said second mentioned anode-electrode means may constitute a variable non-oscillating electronic impedance in operative relation to said first mentioned electrode means, and means for varying the energizing effect of said last mentioned means whereby the frequency of said oscillations may be controlled.

8. An oscillator capable of generating frequency controllable electromagnetic oscillations including a resonant circuit, an electron discharge device comprising a pair of anode electrodes having juxtaposed surfaces defining a space charge chamber adapted to accommodate a rotating space charge of the magnetron type, each of said electrodes being conductively connected to different points on said circuit in energy exchanging relationship therewith, anode-electrode means connected to said circuit at substantially the same electrical point as said electrodes and having surfaces defining a second space charge chamber in close proximity to said first space charge chamber and also adapted to accommodate a rotating space charge of the magnetron type, means supplying magnetic fields of substantially equal magnitudes to said first and second space charge chambers to form said rotating space charges, cathode means in operative relation to each of said space charge chambers and an hermetically sealed envelope enclosing said space charge chambers, said oscillator also including means for energizing said electrodes to establish a rotating space charge of the magnetron type in said first mentioned chamber and thereby to generate oscillations in said circuit, means for energizing said electrode means to establish within said second mentioned chamber a rotating space charge of the magnetron type insufficient to establish oscillations therein whereby said second mentioned anode-electrode means may constitute a variable non-oscillating electronic impedance in operative relation to said anode electrodes, and means for varying the energizing effect of said last mentioned means whereby the frequency of said oscillations may be controlled.

9. An oscillator capable of generating frequency controllable electromagnetic oscillations including, a resonant circuit, an electron discharge device comprising anode-electrode means having juxtaposed surfaces defining a space charge chamber adapted to accommodate a rotating space charge of the magnetron type, said electrode means being conductively connected to said circuit in energy exchanging relationship therewith, anode-electrode means connected to said circuit at substantially the same electrical point as said first mentioned electrode means and having surfaces defining a second space charge chamber in close proximity to said first space charge chamber and also adapted to accommodate a rotating space charge of the magnetron type, a first cathode in operative relation to said first mentioned space charge chambers, a second cathode in operative relation to said second chamber, and an hermetically sealed envelope enclosing said space charge chambers, said oscillator also including means for imposing a voltage between said first mentioned electrode means and said first cathode to establish a rotating space charge of the magnetron type in said first mentioned chamber and thereby to generate oscillations in said circuit, means for imposing a voltage between said second mentioned electrode means and said second cathode to establish within said second mentioned chamber a rotating space charge of the magnetron type insufficient to establish oscillations therein whereby said second mentioned anode-electrode means may constitute a variable non-oscillating electronic impedance in operative relation to said first mentioned anode-electrode means, means supplying magnetic fields of substantially equal magnitudes to said first and second space charge chambers to form said rotating space charges, and means for varying said second mentioned voltage whereby the frequency of said oscillations may be controlled.

10. An oscillator capable of generating frequency controllable electromagnetic oscillations including, a resonant circuit, an electron discharge device comprising a pair of anode electrodes having juxtaposed surfaces defining a space charge chamber adapted to accommodate a rotating space charge of the magnetron type, each of said electrodes being conductively connected to different points on said circuit in energy exchanging relationship therewith, anode-electrode means connected to said circuit at substantially the same electrical point as said electrodes and having surfaces defining a second space charge chamber in close proximity to said first space charge chamber and also adapted to accommodate a rotating space charge of the magnetron type, a first cathode in operative relation to said first mentioned space charge chambers, a second cathode in operative relation to said second chamber, means supplying magnetic fields of substantially equal magnitudes to said first and second space charge chambers to form said rotating space charges, and an hermetically sealed enveloped enclosing said space charge chambers, said oscillator also including means for imposing a voltage between said electrodes and said first cathode to establish a rotating space charge of the magnetron type in said first mentioned chamber and thereby to generate oscillations in said circuit, means for imposing a voltage between said electrode means and said second cathode to establish within said second mentioned chamber a rotating space charge of the magnetron type insufficient to establish oscillations therein whereby said second mentioned anode-electrode means may constitute a variable non-oscillating electronic impedance in operative relation to said anode electrodes, and means for varying said second mentioned voltage whereby the frequency of said oscillations may be controlled.

PHILIP H. PETERS, JR.
JOHN P. BLEWETT.

REFERENCES CITED

The following references are of record in the file of this patent:

UNITED STATES PATENTS

| Number | Name | Date |
|---|---|---|
| 2,110,448 | Linder | Mar. 8, 1938 |
| 2,159,478 | Gerhard | May 23, 1939 |
| 2,241,976 | Blewett et al. | May 13, 1941 |

FOREIGN PATENTS

| Number | Country | Date |
|---|---|---|
| 816,071 | France | Apr. 19, 1937 |